(12) United States Patent
Karjalainen

(10) Patent No.: US 6,392,660 B2
(45) Date of Patent: *May 21, 2002

(54) APPARATUS AND METHOD FOR DISPLAYING ZOOMED VERSION OF STORED IMAGE BY DISPLAYING AND SHIFTING BASED ON PIXEL OVERLAP

(75) Inventor: Juha Pekka Karjalainen, Tampere (FI)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,122

(22) Filed: Jul. 15, 1998

(30) Foreign Application Priority Data

Jul. 18, 1997 (FI) .................................................. 973041

(51) Int. Cl.$^7$ ................................................. G09G 5/00
(52) U.S. Cl. ....................... 345/660; 345/667; 345/668; 345/669; 345/670; 345/671; 345/472; 345/472.2
(58) Field of Search ................................. 345/589, 611, 345/660, 666, 667, 668, 472, 669, 670, 671

(56) References Cited

U.S. PATENT DOCUMENTS

| | | | | |
|---|---|---|---|---|
| 4,090,188 A | | 5/1978 | Suga .......................... 340/324 |
| 4,712,102 A | | 12/1987 | Troupes et al. ............. 340/790 |
| 4,725,892 A | | 2/1988 | Suzuki et al. ............... 358/287 |
| 5,016,002 A | | 5/1991 | Levanto ....................... 340/756 |
| 5,335,295 A | * | 8/1994 | Ferracini et al. .............. 382/47 |
| 5,406,334 A | | 4/1995 | Kondo et al. ................ 348/581 |
| 5,579,030 A | | 11/1996 | Karow ........................ 345/143 |
| 5,589,851 A | * | 12/1996 | Valdes et al. ............... 345/136 |
| 5,657,047 A | * | 8/1997 | Tarolli ........................ 345/127 |
| 5,719,595 A | * | 2/1998 | Hoddie et al. .............. 345/136 |

FOREIGN PATENT DOCUMENTS

| | | |
|---|---|---|
| EP | 0 367 418 A3 | 5/1990 |
| EP | 0 710 925 A2 | 5/1996 |
| WO | WO 84/00223 | 1/1984 |
| WO | WO 96/36015 | 11/1996 |

OTHER PUBLICATIONS

"Continous Anti–Aliased Rotation And Zoom Of Raster Images", Weiman, Computer Graphics, vol. 14, No. 3, pp. 286–293.

"Computer Graphics: Principles and Practice", Foley et al., 1990 pp. 978–979.

Patent Abstracts of Japan, JP 58170167.
Patent Abstracts of Japan, JP 63265656.

* cited by examiner

Primary Examiner—Matthew Luu
Assistant Examiner—Daniel J Chung
(74) Attorney, Agent, or Firm—Perman & Green, LLP

(57) ABSTRACT

A method of displaying a zoomed version of stored image on a display, where the stored image is defined by a set of data entries mapped to respective pixels of the display. The stored image is first scaled relative to the display in accordance with the desired zooming ratio. The scaled image is then located at an initial position relative to the display and the extent to which each display pixel is overlapped by features of the scaled image is determined. A color tone is assigned to each display pixel in accordance with the extent of the overlap. The scaled image is then shifted relative to said initial position one or more times and, for the or each shift, the overlap of each display pixel is recalculated and a new color tone assigned. The sets of assigned color tones are then displayed cyclically on the display to produce a displayed image.

13 Claims, 8 Drawing Sheets

(a)            (b)            (c)

APPARATUS AND METHOD FOR DISPLAYING ZOOMED VERSION OF STORED IMAGE BY DISPLAYING AND SHIFTING BASED ON PIXEL OVERLAP

FIELD OF THE INVENTION

The present invention relates to an apparatus and method for displaying an image and in particular for displaying a zoomed version of a stored image.

BACKGROUND OF THE INVENTION

Electronic displays commonly provide for zooming in and out of a stored image in order to enable a user to see more clearly details of the image or to obtain an overview of the image. An image for display on an electronic display is commonly stored in an electronic memory by way of a matrix of data entries which are mapped on a 1:1 basis with pixels of the display. In order to zoom in on the image, i.e. to make the image or portions of the image larger on the display, each data entry is 'expanded' to cover two or more pixels. However, in order to avoid distortion of the image, each data entry must be expanded to cover a square block of pixels. It is therefore only possible to zoom in on the image by a factor of 2, 3, 4 etc. This is inconvenient, for example, where it is desired to expand text so as to allow it to be more easily read but where expansion by a factor of two or more will result in the edges of the text extending beyond the edges of the display. The user must 'roam' around the image, displaying only bits of it at a time, in order to read the entire text. A problem also arises where an image is too large to be displayed on a display and stored data entries have to be mapped to 'partial' pixels. Solutions proposed to overcome these problems include creating new type fonts in the case of zooming in, and merely dropping pixels in the case of zooming out.

One application where these problems arise is in mobile communication devices which have only a small display and the capability to receive facsimile transmissions.

SUMMARY OF THE INVENTION

It is an object of the present invention to overcome or at least mitigate the disadvantages of conventional zooming methods. In particular, it is an object of the present invention to provide an apparatus and method capable of substantially stepless zooming.

According to first aspect of the present invention there is provided a method of displaying a zoomed version of stored image on a display, where the stored image is defined by a set of data entries mapped to respective pixels of the display, the method comprising the steps of:

(1) scaling the stored image relative to the display in accordance with a desired zooming ratio;

(2) locating the scaled image at an initial position relative to the display;

(3) determining the extent to which each display pixel is overlapped by features of the scaled image, and assigning to each display pixel a corresponding colour tone;

(4) shifting the scaled image relative to said initial position one or more times and, for the or each shift, repeating step (3); and (5) cyclically displaying each of the sets of assigned colour tones in turn for as long as the zoomed version is to be displayed.

It will be understood that the terms 'zoomed' and 'zooming' used in relation to the present invention relate both to the enlargement and reduction of images.

Preferably, step (5) comprises shifting the scaled image in two orthogonal directions (x,y), where the maximum shift from said initial position in the x and the y direction is less than the width of one display pixel (L). Preferably, where a zooming factor of is p/s is applied to scale the image in step (1), and p and s are both integers and s is the lowest common denominator, each shift produced by step (5) translates the scaled image by a multiple of L/s in one or both of the x and y directions. More preferably, the maximum shift is L−L/s which results in each edge feature of the scaled image being sharp in at least one of the initial position and the shifted positions. In this way, it is possible to achieve stepless zooming in which only integers and fixed point calculations are used. The method may be implemented directly in machine code language to achieve sufficient speed for real time zooming.

Preferably, the step of assigning a colour tone to a display pixel comprises mapping the fractional coverage of the display pixel, by features of the scaled image, to a linear range of colour tones. For a monochrome display, said linear range comprises grey-level tones. For a colour display, where the stored image comprises a set of data entries for each of a plurality of colours (e.g. red, green and blue), the method of the above first aspect may be carried out separately for each set of image pixels.

Where the data entries of the stored image correspond themselves to colour tones, step (3) may additionally comprise for each display pixel determining a function of both the fractional overlap and the tone(s) of the overlap, said assignment being made on the basis of the determined function.

Preferably, the time interval between the display of successive sets of assigned colour tones is between 1/20th of a second and 1 second.

According to a second aspect of the present invention there is provided apparatus for displaying a zoomed version of a stored image, the apparatus comprising a display having a matrix of display pixels, a memory for storing an image as a set of data entries mapped to said display pixels, and processing means arranged to:

scale the stored image relative to the display in accordance with a desired zooming ratio;

locate the scaled image at a first position relative to the display;

determine the extent to which each display pixel is overlapped by the scaled image and to assign to each display pixel a corresponding colour tone;

shift the scaled image relative to the display one or more times and repeat the steps of determining and displaying for each shift; and cyclically display each of the sets of assigned colour tones in turn for as long as the zoomed version is to be displayed.

In one embodiment of the present invention, the apparatus is a combined mobile telephone and personal digital assistant. The display may be a liquid crystal display.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
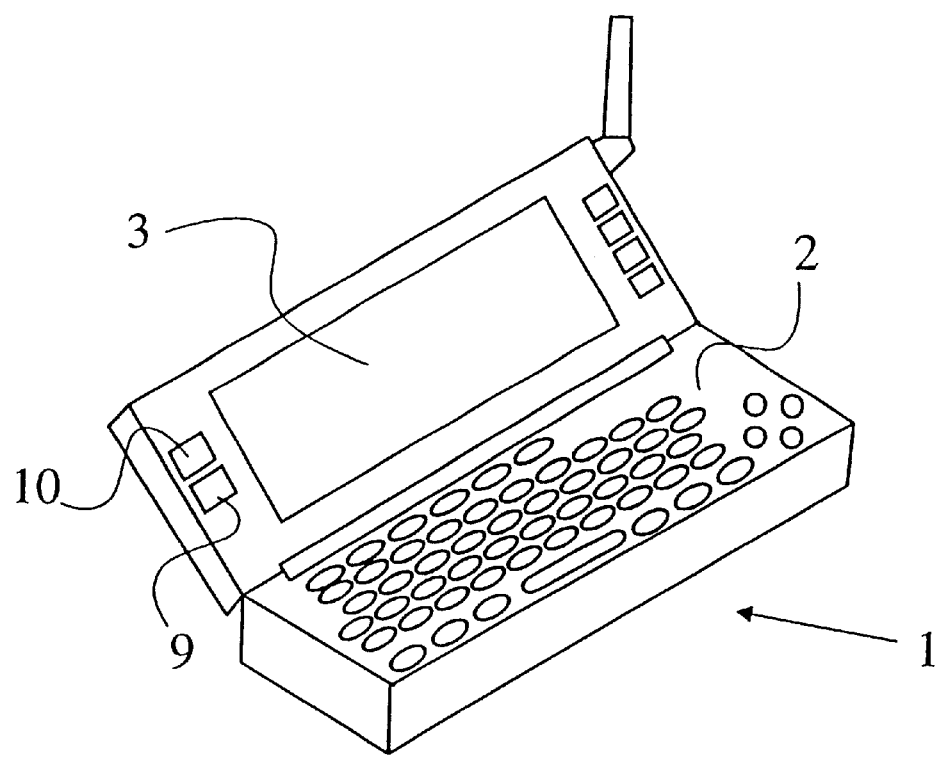
FIG. 1 shows a combined personal data assistant/mobile telephone device.
Figure 2:
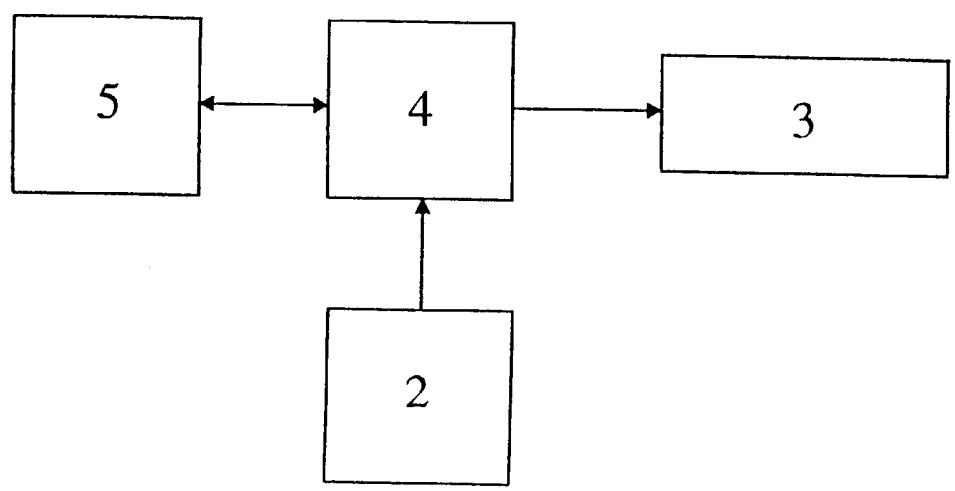
FIG. 2 shows a simplified schematic functional diagram of the device of FIG. 1.

Combined personal data assistant/mobile telephone devices are expected to become commonplace over the next few years as the demand for mobile data communication services increases. One such device 1 is illustrated in FIG. 1 and has a "clam-shell" type construction with a keyboard 2 and a display 3 located on opposed inner surfaces. The functional structure of this device 1 is illustrated in FIG. 2 where a central processing unit (CPU) 4 carries out the main processing operations of the device 1 in response to user input via the keyboard 2. A memory 5 stores data, including data corresponding to images to be displayed on the display. Such display data can be extracted from the memory 5, processed, and transferred to the display 3 by the CPU 4.

Figure 3:
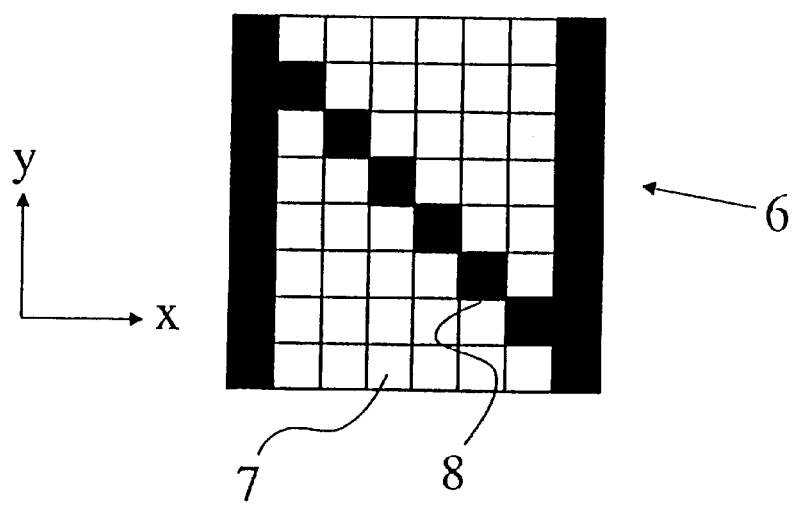
FIG. 3 shows schematically a portion of a display of the device of FIG. 1 on which is displayed an image.

Assume for example that the device has received a facsimile transmission from a remote station. The facsimile is stored in a block of the memory 5 as a set of data entries, each of which can be thought of as an 'image pixel' and which is either black or white. The width of the image in image pixels corresponds to the width of the display 3 in display pixels although the length of the image is generally considerable greater than the length of the display. The user may select to display the image in unzoomed form in which case the image pixels of an upper portion of the image are mapped on a one to one basis with the display pixels to display that upper portion on the display. The user can then scroll down the image as appropriate. FIG. 3 illustrates a portion 6 of the display 3, where the image displayed is the letter 'N'. As can be seen, there is a one to one mapping between the display pixels 7 (having a length L in both the x and y directions) and the image pixels 8.

The user may request to zoom the stored image on the display 3 (centred on the centre of the display 3) using one of an expand and a compress key 9,10. Typically the length of time for which a key 9,10 is pressed will determine the zooming ratio. For the purpose of illustration, assume that the user selects to display the stored image, compressed by a factor of 2/3. An imaginary enlargement of the entire display 3 by a factor of 3 is carried out (illustrated in FIG. 4 for the display portion 6). The stored image is then enlarged by a factor of 2 to give the required relative zooming ratio of 2/3. This can be generalised such that the zooming ratio is p/s where p and s are both integers and s is the lowest common denominator.

Due to the differences in the scaling operations performed on the image and on the display 3, the pixels 8 making up the image are now smaller than the pixels 7 of the display 3. The next step in the zooming process is to compute the area of each notionally enlarged display pixel 7 which is overlapped by features (i.e. black areas) of the notionally enlarged image. For example, from FIG. 4, it can be seen that the top left display pixel 7a has 7/8 ths of its area covered by features of the image. Now assume that the display 3 is capable of displaying ten different grey levels (or tones) ranging from white to black (0 to 9). A grey level is then assigned to each display pixel 7 by mapping the determined fractional coverage to the linear grey scale. For example, the upper left pixel 7a is assigned a grey level of 8 whilst the upper pixel, second from the left, 7b is assigned a grey level of 2.

Figure 4:
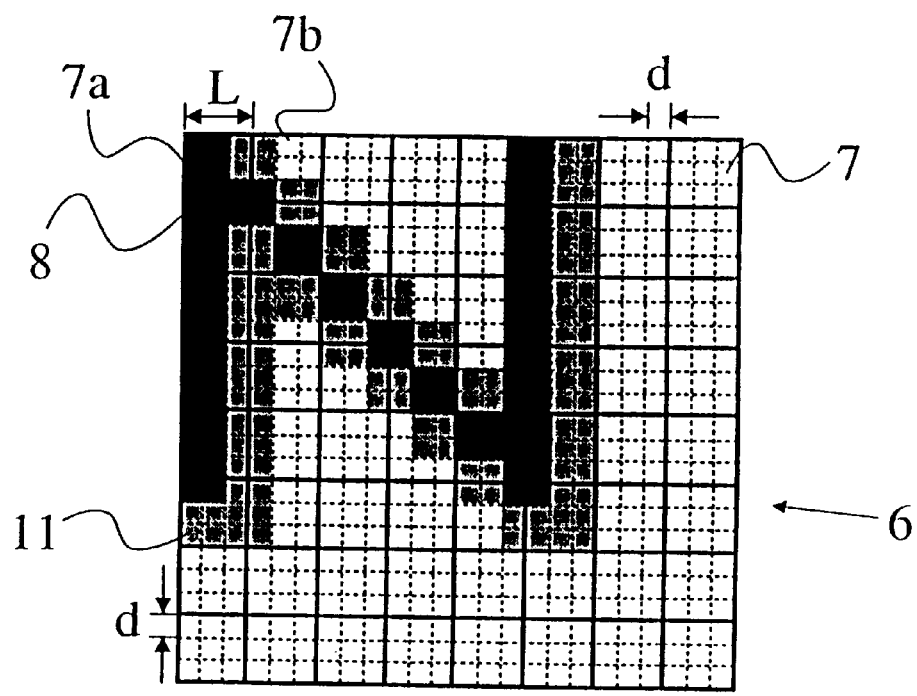
FIG. 4 shows an enlarged view of the display portion of FIG. 3 with a scaled version of the image displayed thereon.

From FIG. 4, it will be appreciated that the left hand edge of the image "N" will consist of a line of pixels displayed with a grey level of 8 and will therefore appear relatively sharp on the display 3. However, the right hand edge of the image is displayed as a line of pixels having a grey level of only 4 and will therefore appear somewhat blurred on the display 3. It will also be appreciated however that if the image is shifted to the right by 2/3 of a display pixel length L, the right hand edge of the image will become sharp whilst the left hand edge will become blurred. Similarly, other edge features of the image will become blurred or sharp at intermediate positions of the image relative to the display 3.

Figure 5:
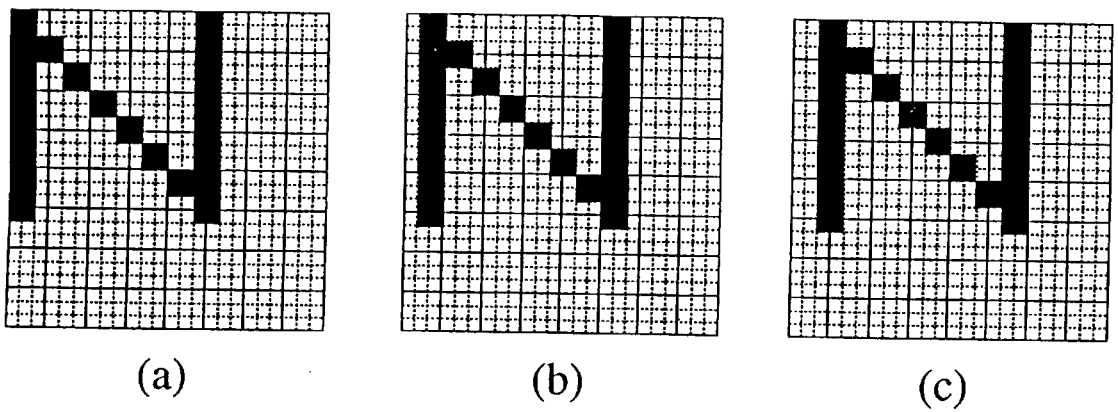
FIG. 5 shows the enlarged display portion of FIG. 4 with the scaled image displayed at three different positions.
Figure 6A:
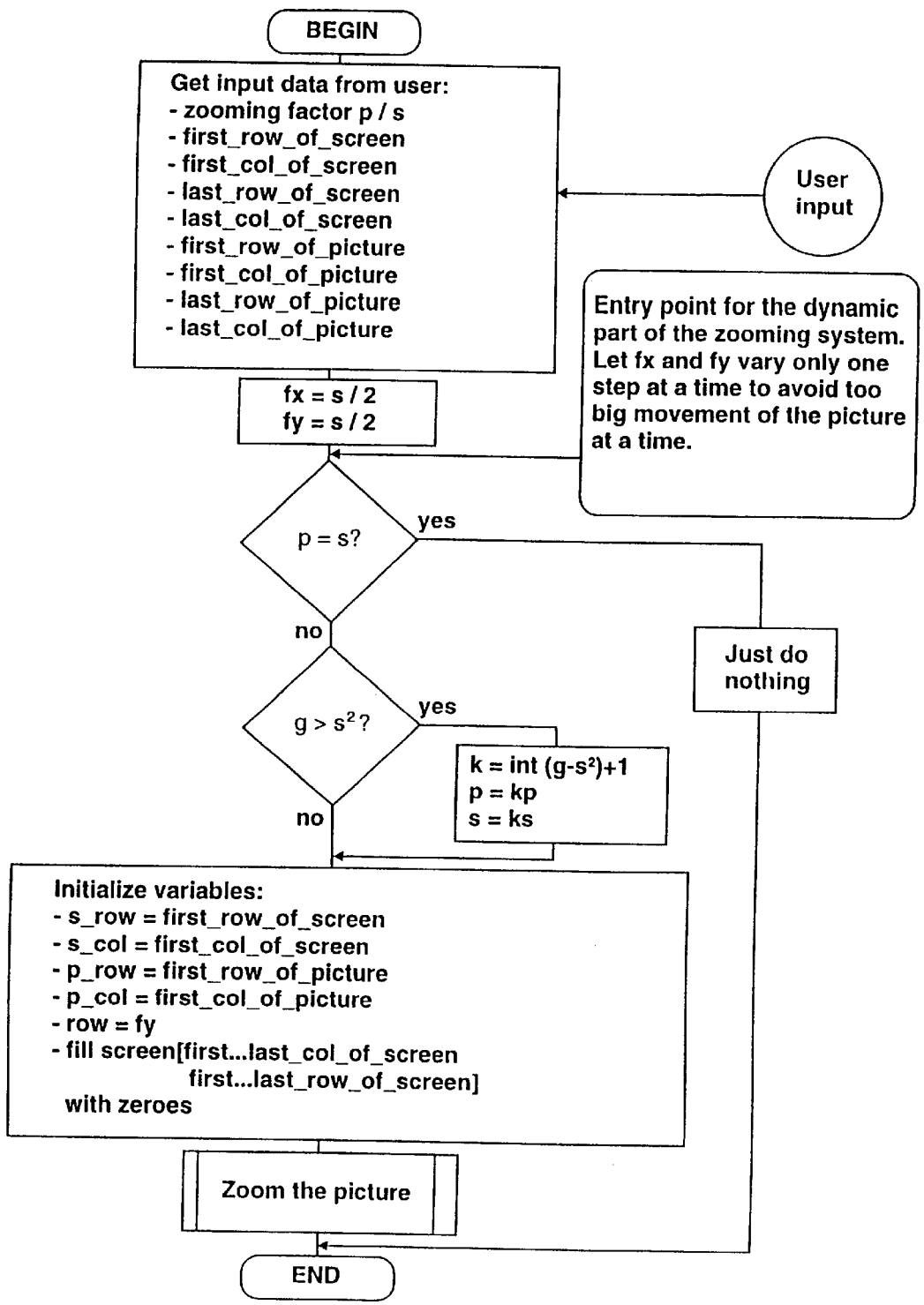
FIGS. 6a to 6e are flow diagrams describing a method of displaying a scaled version of a stored image on a display of the device of FIG. 1.
Figure 6B:
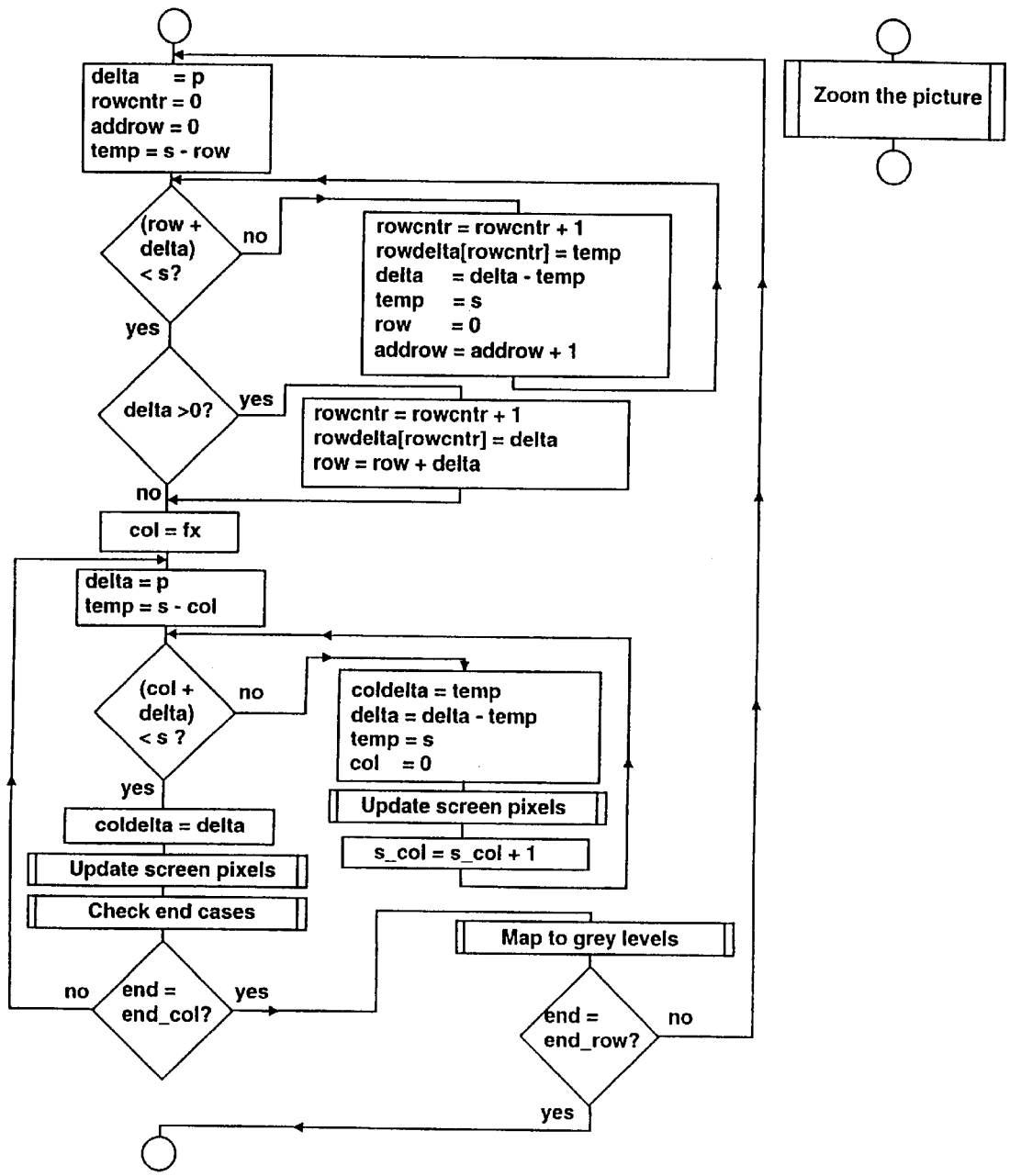
Figure 6C:
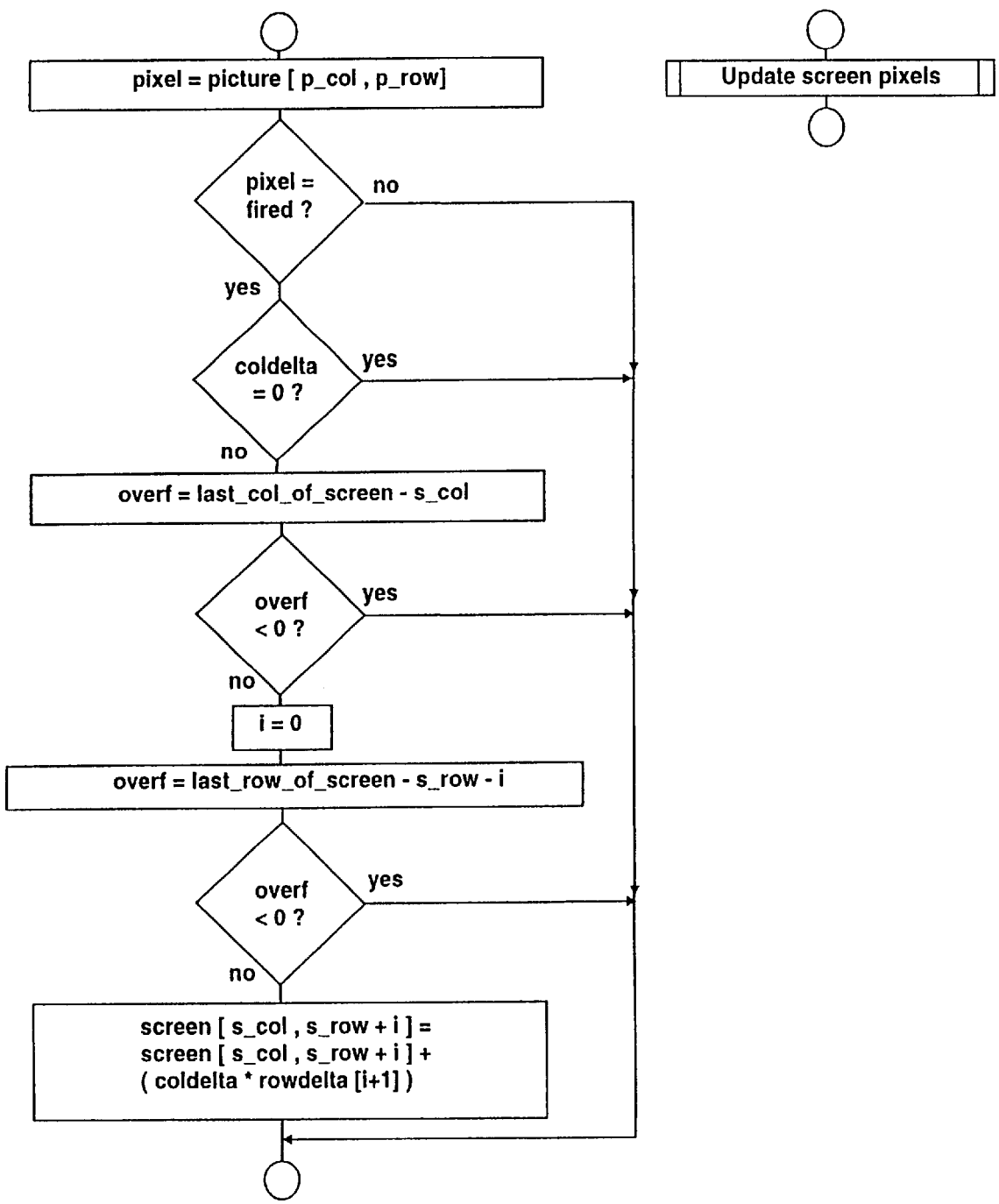
Figure 6D:
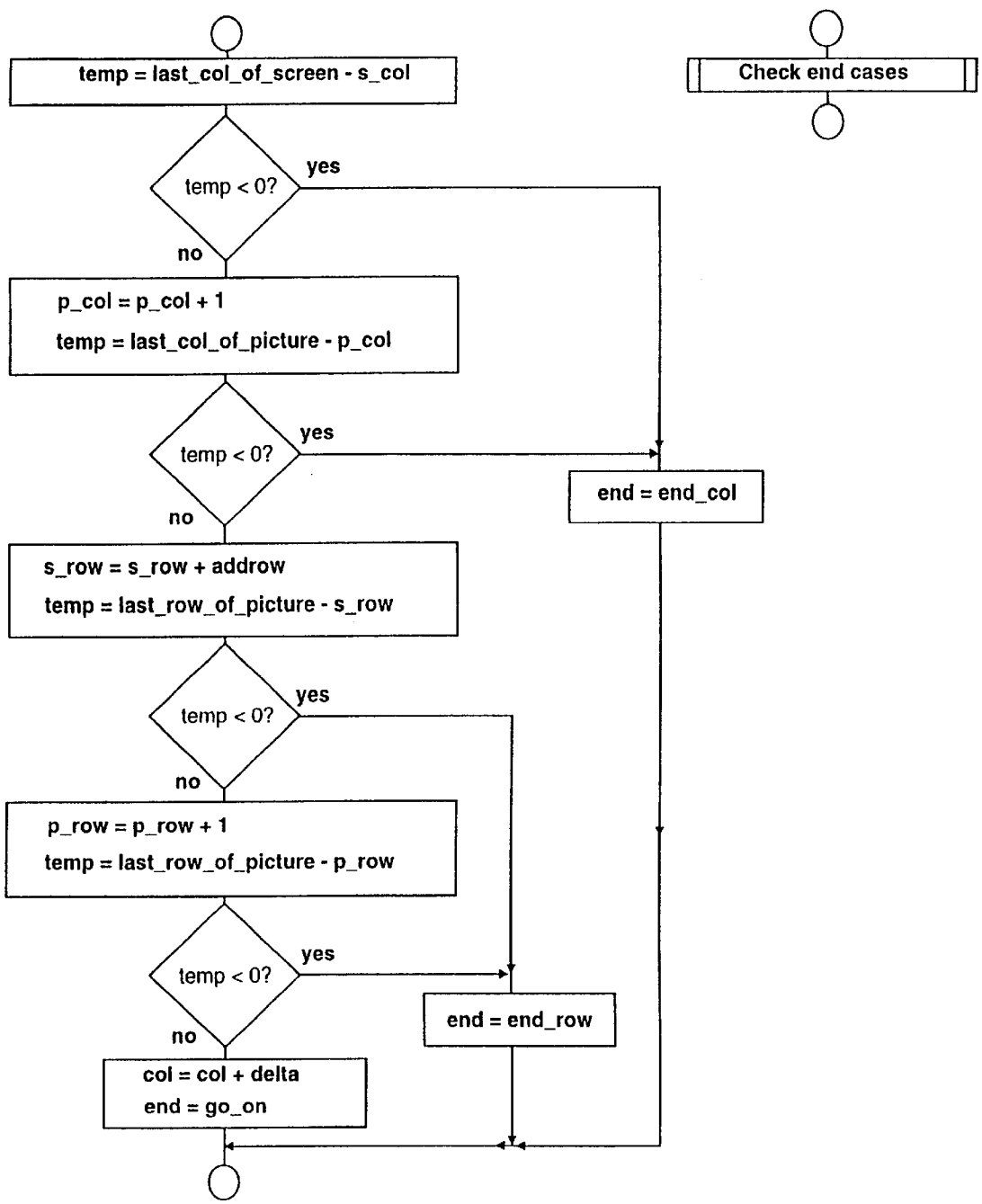
Figure 6E:
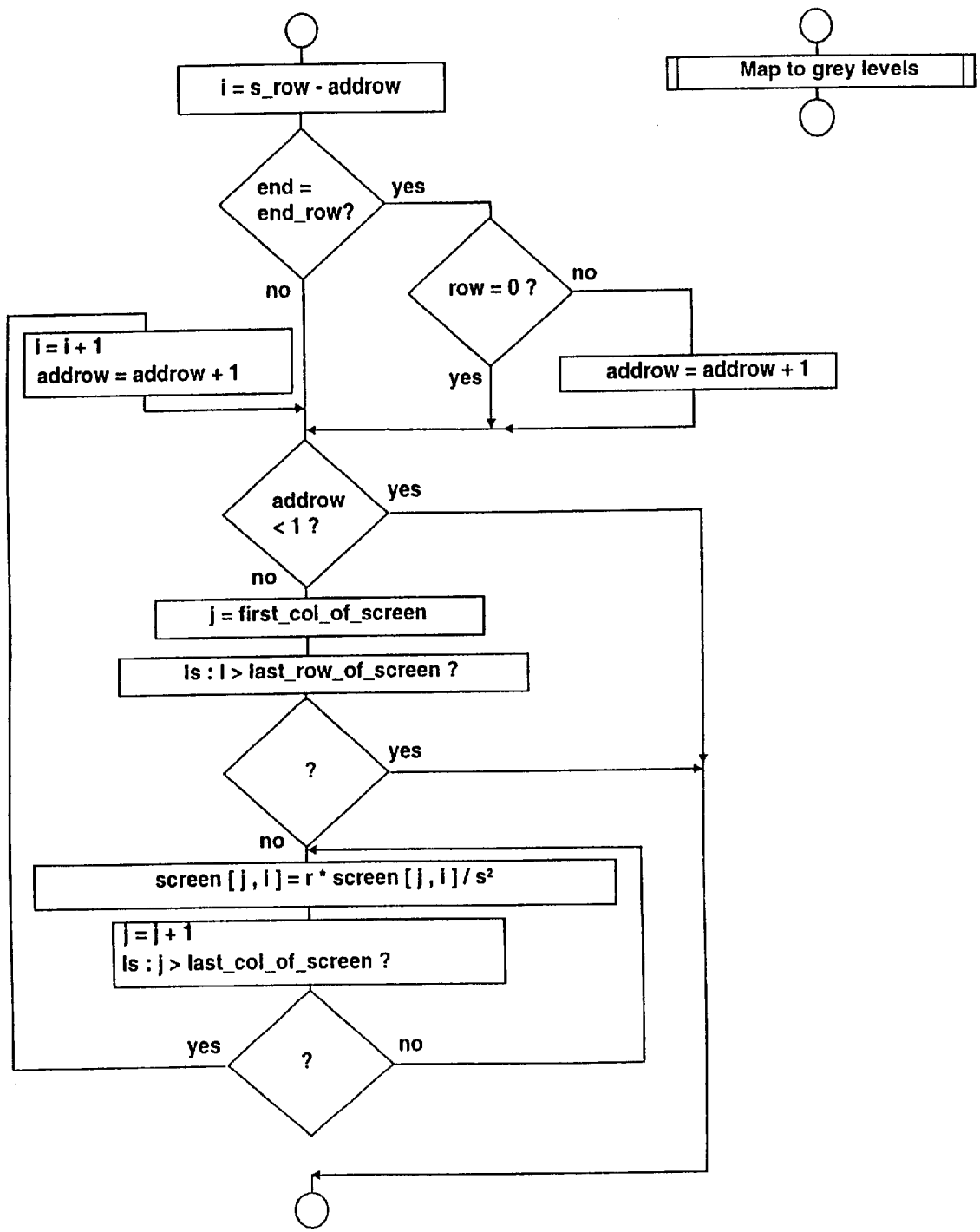

By cyclically moving the image relative to the display 3, with a maximum shift in the x and y directions of 2/3 L, it is possible to ensure that all edge features are sharp at least one position during the cycle. For the image 'N' shown in FIG. 4, this range of movement is illustrated by the lightly shaded area 11. It is not necessary to consider the infinite range of positions within which the image can be shifted. Rather, it is only necessary to consider discrete shifts of d in the x and y directions, where d=1/3 L (or more generically 1/3 L). The three positions which the image takes relative to the display in the x direction are illustrated in FIGS. 5(a) to 5(c). Similarly, the image can take three positions relative to the display in the y direction giving a total of nine positions.

The fractional coverage of each display pixel 7 by image features is determined at each of these nine positions and grey levels assigned to the pixels accordingly. The result is a set of display pixel/grey level assignments for each relative position. These are stored in the memory 5 of the device 1. It is noted that it is possible to compute these data sets using only integers and fixed point calculations, i.e. floating point calculations are not required. The method may be implemented directly in machine code language to achieve sufficient speed for real time zooming.

The CPU 4 then causes each of the grey scale sets, or 'fuzzy' images, to be displayed in turn, for example at intervals of 500 ms, continuously repeating this cycle for as long as the zoomed image is to be displayed. It is noted that the time interval between the display of successive sets of grey scales should be long enough to allow each displayed set to be perceived by the viewer. Moreover, the time interval may be determined to some extent by the speed of the display.

This process is equally applicable to zooming in on a stored image, i.e. where the image is enlarged relative to the display 3. It may also be applied to colour images where the image is stored, for example, by way of three independent data sets corresponding to the colours red, green, and blue. In this case, the process is carried out separately for each data set, where the fractional overlap of each display pixel 7 is mapped to a linear tonal scale for the appropriate colour. At each relative shift, a composite image is displayed by combining the corresponding three colour tone set.

FIGS. 6a to 6e are flow charts illustrating in detail an implementation of the dynamic zooming process described above.

It will be appreciated that modifications may be made to the above described embodiment without departing from the scope of the present invention. For example, where the stored image comprises a grey level assigned to each pixel, the zooming process may compute, at each shift and for each display pixel, a function which is a combination of the fractional coverage and the grey level(s) of the overlapping image feature(s). For example, this function may be the product of the fractional coverage and of the grey level. The function value may then be mapped to a linear grey level scale to assign a grey level to the display pixel.

What is claimed is:

1. A method of displaying a zoomed version of stored image on a display, where the stored image is defined by a set of data entries mapped to respective pixels of the display, the method comprising the steps of:
   (1) scaling the stored image relative to the display in accordance with a desired zooming ratio;
   (2) displaying the scaled image at an initial position relative to the display;
   (3) determining the extent to which each display pixel is overlapped by features of the scaled image, and assigning to each display pixel a corresponding colour tone;
   (4) shifting the scaled image relative to said initial position one or more times and, for the or each shift, repeating step (3); and
   (5) cyclically displaying each of the sets of assigned colour tones in turn for as long as the zoomed version is to be displayed, wherein said shifting occurs with time intervals long enough to allow successive displayed sets of assigned colour tones to be perceived separately in different discrete positions by a user.

2. A method according to claim 1, wherein step (4) comprises shifting the scaled image in one of two orthogonal directions (x,y) where the maximum shift from said initial position in the x and the y direction is less than the width of one display pixel (L).

3. A method according to claim 1, wherein a zooming factor of p/s is applied to scale the image in step, and p and s are both integers and s is the lowest common denominator, each shift produced by step translating the scaled image by a multiple of L/s in one or both of the x and y directions.

4. A method according to claim 3, wherein the maximum shift is L−L/s which results in each edge feature of the scaled image being sharp in at least one of the initial position and the shifted positions.

5. A method according to claim 1, wherein the step of assigning a colour tone to a display pixel comprises mapping the fractional coverage of the display pixel, by features of the scaled image, to a linear range of colour tones.

6. A method according to claim 1, wherein the data entries of the stored image correspond themselves to colour tones, and step additionally comprises, for each display pixel, determining a function of both the fractional overlap and the tone(s) of the overlap, said assignment being made on the basis of the determined function.

7. A method according to claim 5, wherein the display is a monochrome display and said linear range comprises grey-level tones.

8. A method of displaying a stored colour image on a colour display, where the stored image comprises a set of data entries for each of a plurality of colours, the method comprising carrying out the method of claim 1 for each of said colours.

9. A method according to claim 1, wherein the time interval between the display of successive sets of assigned colour tones is between 1/20th of a second and 1 second.

10. Apparatus for displaying a zoomed version of a stored image, the apparatus comprising a display having a matrix of display pixels, a memory for storing an image as a set of data entries mapped to said display pixels, and processing means arranged to:
   scale the stored image relative to the display in accordance with a desired zooming ratio;
   display the scaled image at a first position relative to the display;
   determine the extent to which each display pixel is overlapped by the scaled image and to assign to each display pixel a corresponding colour tone;
   shift the scaled image relative to the display one or more times and repeat the steps of determining and displaying for each shift; and
   cyclically display each of the sets of assigned colour tones in turn for as long as the zoomed version is to be displayed, wherein said shifting occurs with time intervals long enough to allow successive displayed sets of assigned colour tones to be perceived separately in different discrete positions by a user.

11. The method according to claim 1, wherein in step (2), the displaying is on the display.

12. The apparatus according to claim 10, wherein the processing means causes the scaled image to be displayed on the display.

13. A method of displaying a zoomed version of a stored image on a display, where the stored image is defined by a set of data entries mapped to respective pixels of the display, the method comprising the steps of:
   scaling the stored image relative to the display in accordance with a desired zooming ratio;
   selecting a position for displaying the scaled image relative to the display;
   determining the extent to which each display pixel is overlapped by features of the scaled image, and assigning to each display pixel a corresponding colour tone;
   storing each display pixel in a set for displaying the scaled image, wherein each set of display pixels is associated with a selected position;
   selecting another position for displaying the scaled image which is shifted relative to the previously selected position on the display, without displaying the scaled image;
   cyclically repeating the steps of:
   determining the extent to which each display pixel is overlapped by features of the scaled image, and assigning to each display pixel a corresponding colour tone,
   storing each display pixel in a set for displaying the scaled image, wherein each set of display pixels is associated with a selected position,
   selecting another position for displaying the scaled image which is shifted relative to the previously selected position on the display, without displaying the scaled image, for each selected position on the display; and
   cyclically displaying the set of stored display pixels for each scaled image at each associated selected position on the display as long as the zoomed version is to be displayed, wherein the displaying of each scaled image occurs with time intervals long enough to allow each successive scaled image to be perceived separately in a different discrete position by a user.

* * * * *